United States Patent
Chen et al.

(10) Patent No.: US 12,411,723 B2
(45) Date of Patent: Sep. 9, 2025

(54) SYSTEM AND METHOD FOR DETECTING OVERLOGGING ISSUES IN STORAGE SYSTEMS

(71) Applicant: Dell Products L.P., Round Rock, TX (US)

(72) Inventors: Jing Chen, Shanghai (CN); Michael Lee Burriss, Raleigh, NC (US); Wen Jiang, Shanghai (CN); Rong Yang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 18/363,083

(22) Filed: Aug. 1, 2023

(65) Prior Publication Data

US 2025/0045141 A1    Feb. 6, 2025

(51) Int. Cl.
G06F 11/00     (2006.01)
G06F 11/07     (2006.01)
G06F 11/30     (2006.01)

(52) U.S. Cl.
CPC ...... *G06F 11/0781* (2013.01); *G06F 11/0772* (2013.01); *G06F 11/3034* (2013.01)

(58) Field of Classification Search
CPC ............ G06F 11/0781; G06F 11/0772; G06F 11/3034; G06F 11/3476

USPC ........................................................ 714/1–57
See application file for complete search history.

(56) References Cited

U.S. PATENT DOCUMENTS

| | | | | |
|---|---|---|---|---|
| 11,726,850 B2 * | 8/2023 | Colgrove | ............ | G06F 11/0727 714/45 |
| 11,809,271 B1 * | 11/2023 | Wang | ............ | G06F 11/008 |
| 2006/0059253 A1 * | 3/2006 | Goodman | ............ | G06Q 10/10 709/223 |
| 2015/0143182 A1 * | 5/2015 | Rajamanickam | ... | G06F 11/0781 714/48 |
| 2015/0347212 A1 * | 12/2015 | Bartley | ............ | G06F 11/0709 714/37 |
| 2021/0311817 A1 * | 10/2021 | Badiger | ............ | G06F 11/0715 |
| 2023/0125932 A1 * | 4/2023 | Ni | ............ | G06F 11/079 714/37 |
| 2023/0273852 A1 * | 8/2023 | Anand | ............ | G06F 11/3006 714/15 |

* cited by examiner

*Primary Examiner* — Sarai E Butler
(74) *Attorney, Agent, or Firm* — Brian J. Colandreo; Heath M. Sargeant; Holland & Knight LLP

(57) ABSTRACT

A method, computer program product, and computing system for processing a plurality of log files from one or more storage systems. A log pattern concerning at least two or more log files is identified by processing each log file from the plurality of log files using one or more processing threads. A potential overlogging issue associated with the log pattern is identified.

18 Claims, 10 Drawing Sheets

SYSTEM AND METHOD FOR DETECTING OVERLOGGING ISSUES IN STORAGE SYSTEMS

BACKGROUND

Storing and safeguarding electronic content may be beneficial in modern business and elsewhere. Accordingly, various methodologies may be employed to protect and distribute such electronic content.

Logging is present in software development and has many different forms. Engineers highly rely on logging to triage/diagnostic when failure/fault happened, especially in complicated storage products. Most of storage products are component based, meanwhile logging is designed as system-wide and shared amongst different components, so that when system is running, different components will race for the logging resources. With the complicated system design and rapid system growth, storage products have to print massive amounts of log lines.

However, poor logging practice may lead to overlogging issues, which could cause many serious consequences: 1) excessive logging can consume excessive storage system resources, such as CPU or disks, which hinders the performance of the storage system and/or reduces the life and wear of storage components such as internal hard drives thereby reducing their effectiveness over time causing an increase in cost for the appliance vendor when components fail earlier than they otherwise would without excessive logging; 2) excessive logging could suppress the real anomalous logs, which will clutter the troubleshooting/triage/diagnostic process. Furthermore, searching and mining context from an inconsistent large volume of logs will increase troubleshooting time. In the worst case, it even rushes out all other useful logs and makes engineers unable to root cause/recover the failure or fault in internal, even customer environments; 3) excessive logging can make log files to become petabytes large, thus requiring more bandwidth and time to transfer, and more disk space to store; and/or 4) excessive logging may cause too many messages that engineers have to go through to find issues.

SUMMARY OF DISCLOSURE

In one example implementation, a computer-implemented method executed on a computing device may include, but is not limited to, processing a plurality of log files from one or more storage systems. A log pattern concerning at least two or more log files is identified by processing each log file from the plurality of log files using one or more processing threads. A potential overlogging issue associated with the log pattern is identified.

One or more of the following example features may be included. The plurality of log files generated by the one or more storage systems may be monitored for one or more log patterns. One or more log files from the plurality of log files may be filtered based upon, at least in part, the one or more log patterns detected in the plurality of log files. A plurality of log files being generated by the one or more storage systems may be monitored for one or more log patterns. An alert indicative of an overlogging issue may be generated in response to detecting a log pattern associated with an overlogging issue. Subsequent data collection may be requested from the one or more storage systems for additional log files associated with the one or more log patterns. One or more log files may be filtered from the plurality of log files based upon, at least in part, the one or more log patterns detected in the plurality of log files. Processing the plurality of log files may include dividing the log file into a plurality of log file portions. Processing each log file from the plurality of log files using the one or more processing threads may include processing each log file to identify the log pattern based upon, at least in part, one or more of: a log file location; a log file format; a time window associated with the log file; and a log line format. Processing each log file from the plurality of log files using the one or more processing threads may include aggregating results from the one or more processing threads for each log file into a plurality of queues. A report including the potential overlogging issue associated with the log pattern may be generated based upon, at least in part, the plurality of queues.

In another example implementation, a computer program product resides on a computer readable medium that has a plurality of instructions stored on it. When executed by a processor, the instructions cause the processor to perform operations that may include, but are not limited to, processing a plurality of log files from one or more storage systems. A log pattern concerning at least two or more log files is identified by processing each log file from the plurality of log files using one or more processing threads. A potential overlogging issue associated with the log pattern is identified.

One or more of the following example features may be included. The plurality of log files generated by the one or more storage systems may be monitored for one or more log patterns. One or more log files from the plurality of log files may be filtered based upon, at least in part, the one or more log patterns detected in the plurality of log files. A plurality of log files being generated by the one or more storage systems may be monitored for one or more log patterns. An alert indicative of an overlogging issue may be generated in response to detecting a log pattern associated with an overlogging issue. Subsequent data collection may be requested from the one or more storage systems for additional log files associated with the one or more log patterns. One or more log files may be filtered from the plurality of log files based upon, at least in part, the one or more log patterns detected in the plurality of log files. Processing the plurality of log files may include dividing the log file into a plurality of log file portions. Processing each log file from the plurality of log files using the one or more processing threads may include processing each log file to identify the log pattern based upon, at least in part, one or more of: a log file location; a log file format; a time window associated with the log file; and a log line format. Processing each log file from the plurality of log files using the one or more processing threads may include aggregating results from the one or more processing threads for each log file into a plurality of queues. A report including the potential overlogging issue associated with the log pattern may be generated based upon, at least in part, the plurality of queues.

In another example implementation, a computing system includes at least one processor and at least one memory architecture coupled with the at least one processor, wherein the at least one processor configured to process a plurality of log files from one or more storage systems. A log pattern concerning at least two or more log files is identified by processing each log file from the plurality of log files using one or more processing threads. A potential overlogging issue associated with the log pattern is identified.

One or more of the following example features may be included. The plurality of log files generated by the one or more storage systems may be monitored for one or more log patterns. One or more log files from the plurality of log files may be filtered based upon, at least in part, the one or more log patterns detected in the plurality of log files. A plurality of log files being generated by the one or more storage systems may be monitored for one or more log patterns. An alert indicative of an overlogging issue may be generated in response to detecting a log pattern associated with an overlogging issue. Subsequent data collection may be requested from the one or more storage systems for additional log files associated with the one or more log patterns. One or more log files may be filtered from the plurality of log files based upon, at least in part, the one or more log patterns detected in the plurality of log files. Processing the plurality of log files may include dividing the log file into a plurality of log file portions. Processing each log file from the plurality of log files using the one or more processing threads may include processing each log file to identify the log pattern based upon, at least in part, one or more of: a log file location; a log file format; a time window associated with the log file; and a log line format. Processing each log file from the plurality of log files using the one or more processing threads may include aggregating results from the one or more processing threads for each log file into a plurality of queues. A report including the potential overlogging issue associated with the log pattern may be generated based upon, at least in part, the plurality of queues.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
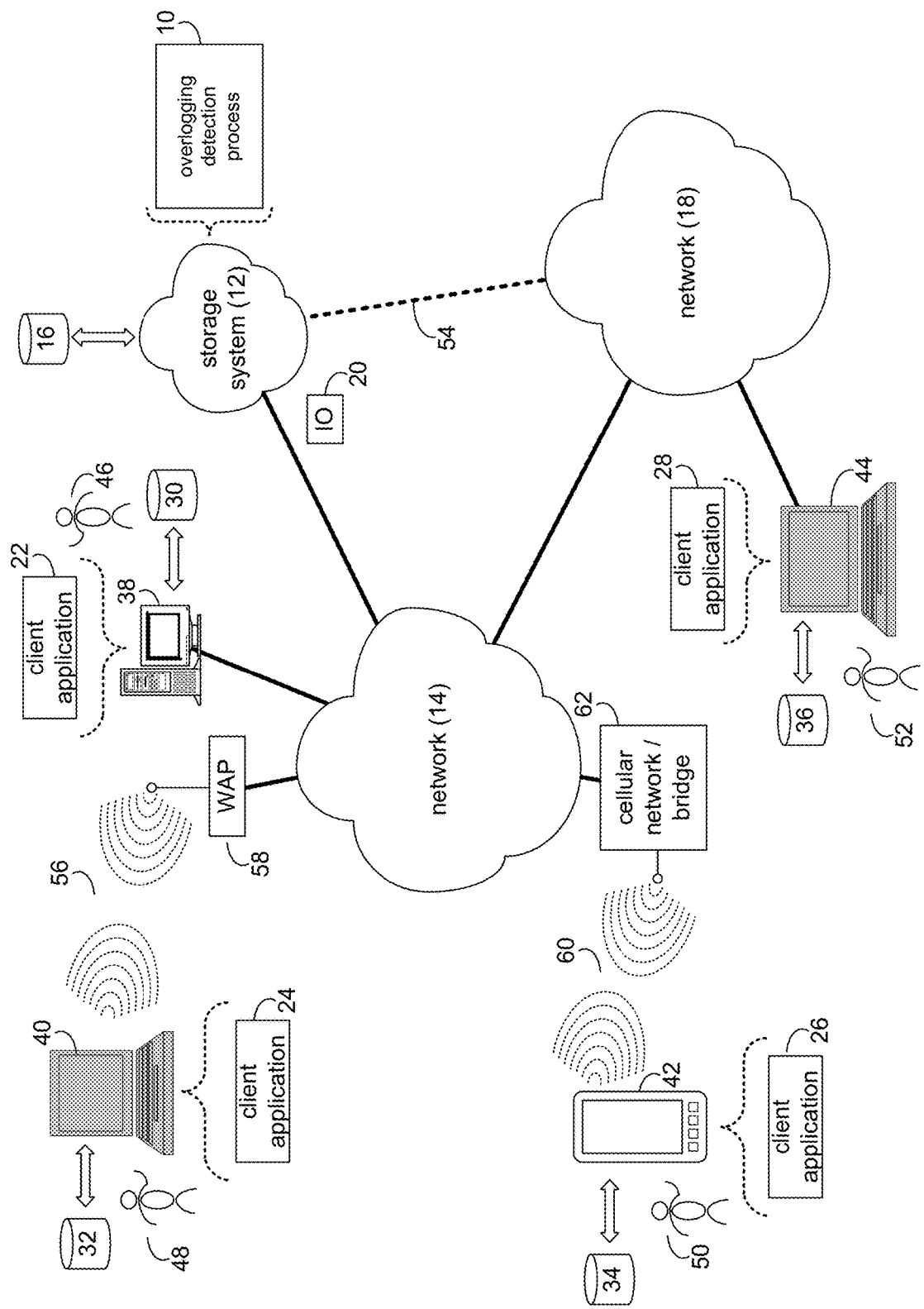
FIG. 1 is an example diagrammatic view of a storage system and an overlogging detection process coupled to a distributed computing network according to one or more example implementations of the disclosure.

System Overview:

Referring to FIG. 1, there is shown overlogging detection process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of overlogging detection process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of overlogging detection process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a overlogging detection process, such as overlogging detection process 10 of FIG. 1, may include but is not limited to, processing a plurality of log files from one or more storage systems. A log pattern concerning at least two or more log files is identified by processing each log file from the plurality of log files using one or more processing threads. A potential overlogging issue associated with the log pattern is identified.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
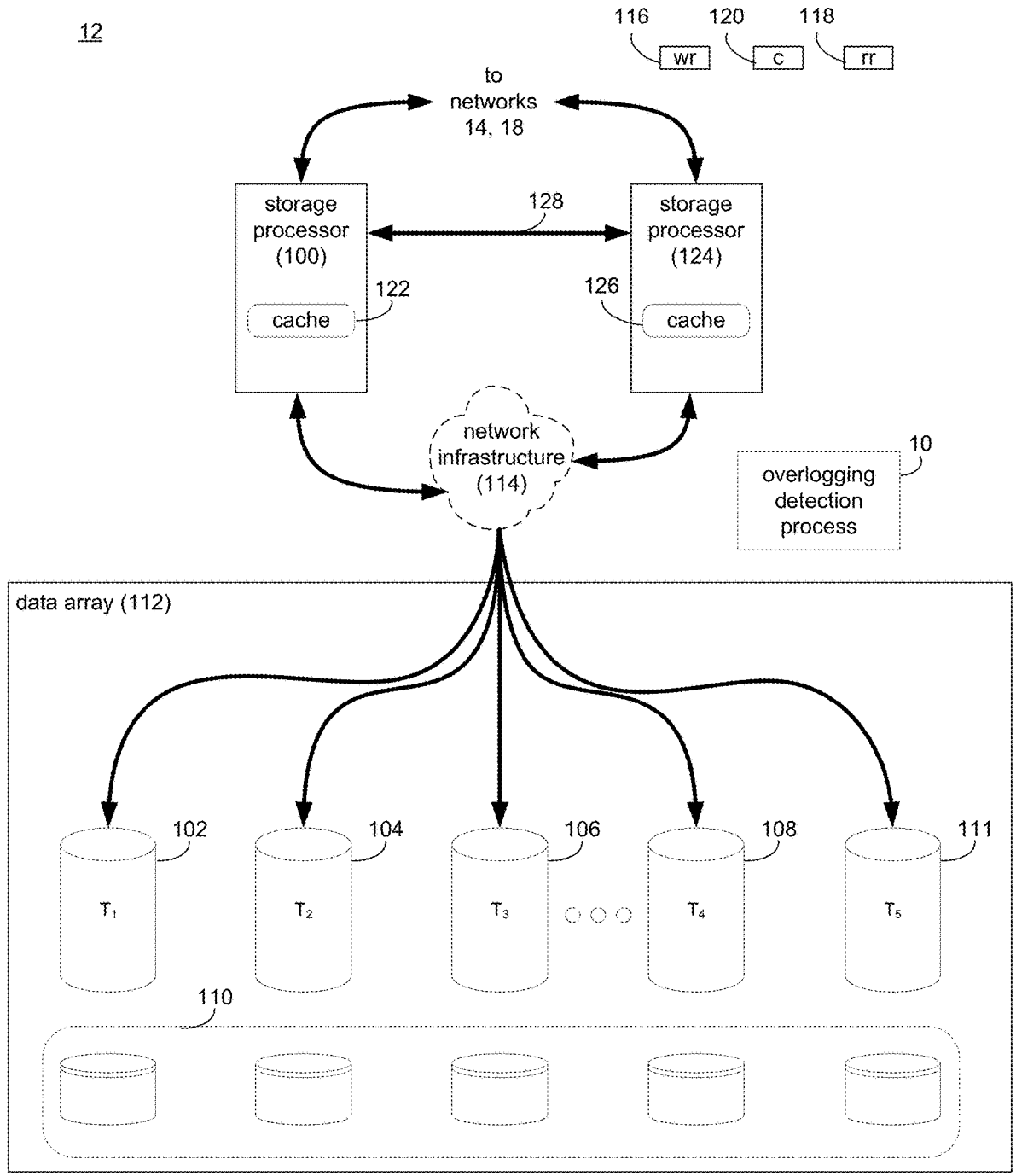
FIG. 2 is an example diagrammatic view of the storage system of FIG. 1 according to one or more example implementations of the disclosure.
Figure 3:
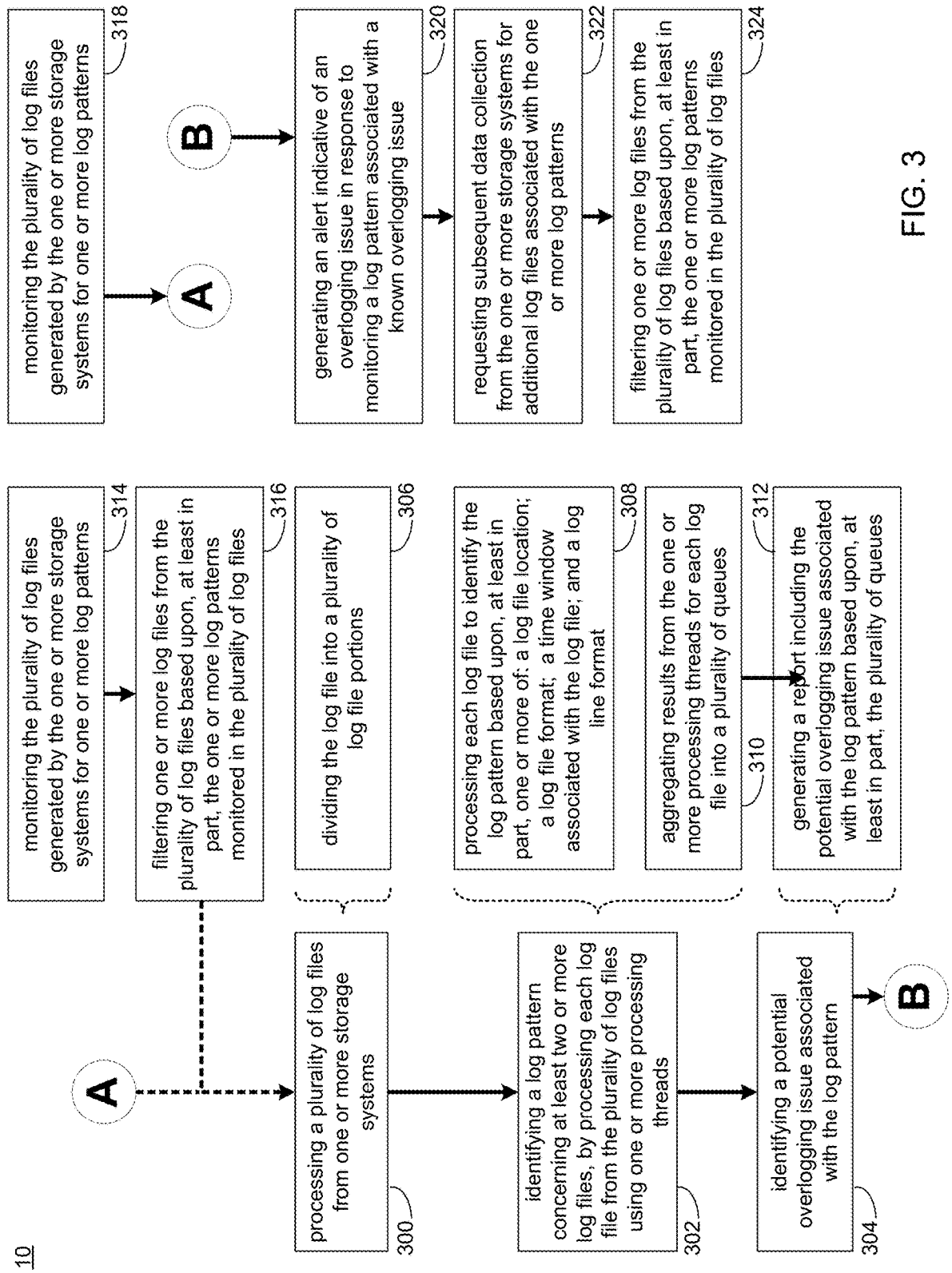
FIG. 3 is an example flowchart of overlogging detection process according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of overlogging detection process 10. The instruction sets and subroutines of overlogging detection process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of overlogging detection process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of overlogging detection process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of overlogging detection process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Overlogging Detection Process:

Referring also to the examples of FIGS. 3-10 and in some implementations, overlogging detection process 10 may process 300 a plurality of log files from one or more storage systems. A log pattern concerning at least two or more log files may be identified 302 by processing each log file from the plurality of log files using one or more processing threads. A potential overlogging issue associated with the log pattern may be identified 304.

As will be discussed in greater detail below, implementations of the present disclosure may allow for a continual analysis of log files to identify overlogging by identifying log patterns associated with overlogging. Logging is present in software development and has many different forms. Engineers highly rely on logging to triage/diagnostic when failure/fault happened, especially in complicated storage products. Most of storage products are component based, meanwhile logging is designed as system-wide and shared amongst different components, so that when system is running, different components will race for the logging resources. With the complicated system design and rapid system growth, storage products have to print massive amounts of log lines.

However, poor logging practice may lead to overlogging issues, which could cause many serious consequences: 1) excessive logging can consume excessive storage system resources, such as CPU or disks, which hinders the performance of the storage system and/or reduces the life and wear of storage components such as internal hard drives thereby reducing their effectiveness over time causing an increase in cost for the appliance vendor when components fail earlier than they otherwise would without excessive logging; 2) excessive logging could suppress the real anomalous logs, which will clutter the troubleshooting/triage/diagnostic process. Furthermore, searching and mining context from an inconsistent large volume of logs will increase troubleshooting time. In the worst case, it even rushes out all other useful logs and makes engineers unable to root cause/recover the failure or fault in internal, even customer environments; 3) excessive logging can make log files to become petabytes large, thus requiring more bandwidth and time to transfer, and more disk space to store; and/or 4) excessive logging may cause too many messages that engineers have to go through to find issues.

As will be discussed in greater detail below, implementations of the present disclosure provide a overlogging detection system that accounts for overlogging in a single data collection event with static log files, continuous overlogging detection for many storage systems, and real-time or "live" overlogging detection. In this manner, overlogging issues may be identified and remedial actions (e.g., filtering duplicative logs, prioritizing certain logs, etc.) may be implemented to improve the processing capacity of a storage system. Accordingly, overlogging detection process 10 may reduce the amount of overlogging and the associated impact(s) on storage system performance. Additionally, overlogging detection process 10 provides increased accuracy in the detection of "highly-likely" or "highly potential" overlogging issues as opposed to false alarms.

Overlogging Issue Detection for a Single Data Collection Event

Figure 4:
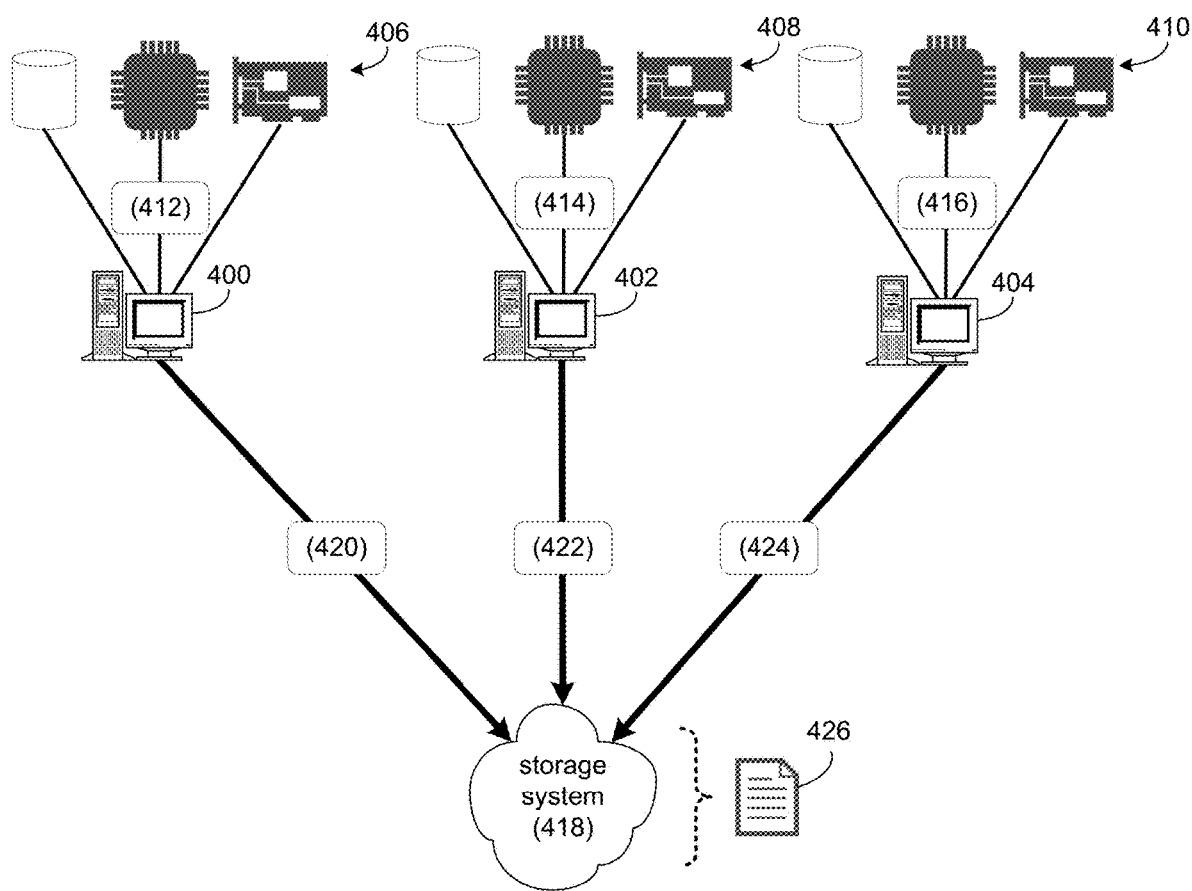
FIG. 4 is an example diagrammatic view of the processing of log files from various storage systems according to an example implementation of the disclosure.
Figure 5:
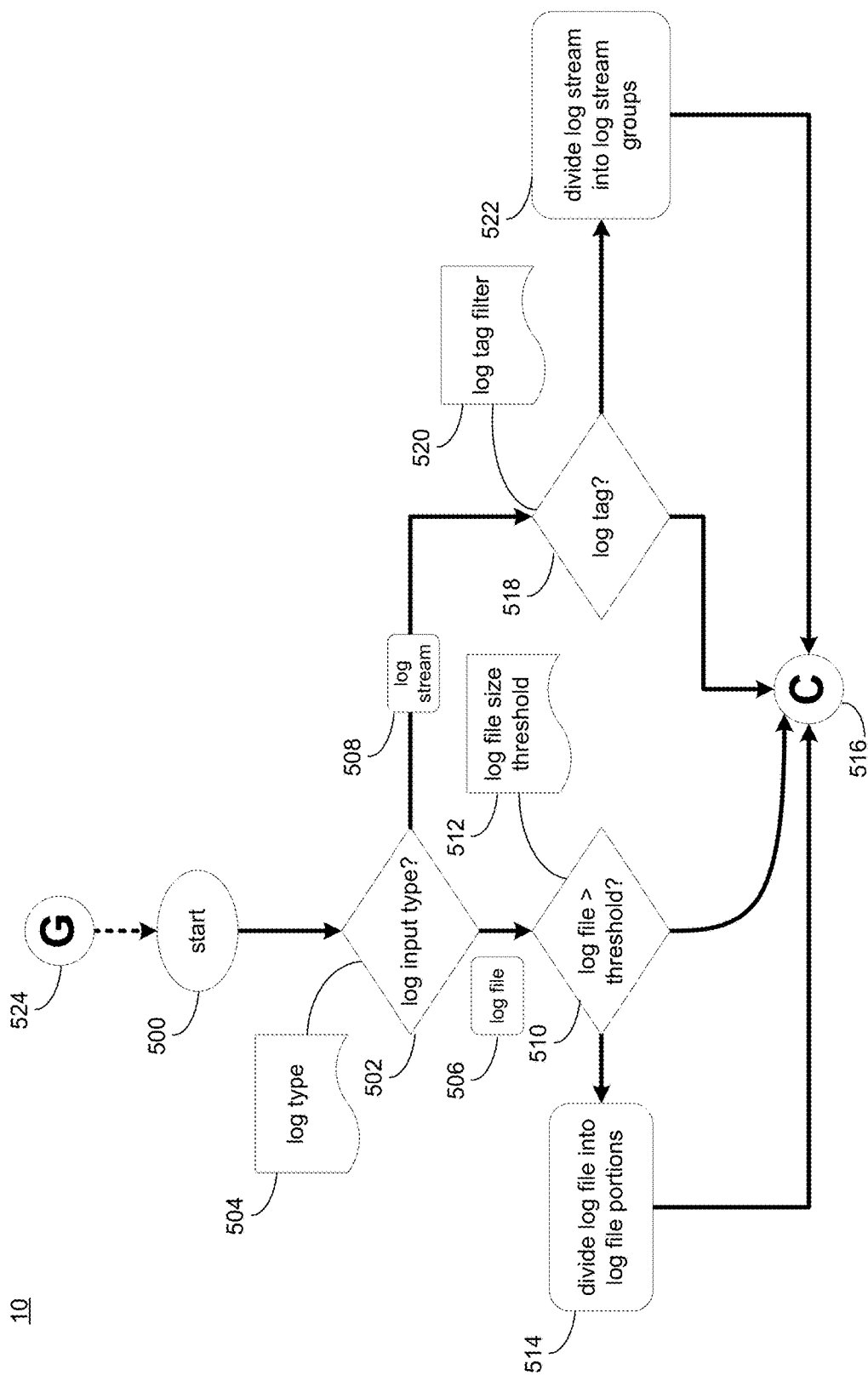
FIGS. 5-8 are example flowcharts of the overlogging detection process for overlogging issue detection for a single data collection event according to one or more example implementations of the disclosure.

In some implementations, overlogging detection process 10 processes 300 a plurality of log files from one or more storage systems. As discussed above, when components of a storage system are operating, various logs or log files are generated. A log file is a computer-generated data file that contains information about usage patterns, activities, and operations within an operating system, application, server or another device. Log files typically show whether resources are performing properly and optimally. Log files can be processed internally within a storage system or transmitted to another computing device (e.g., a vendor support system) for triaging and understanding issues within a storage system. For example and as shown in FIG. 4, multiple storage systems (e.g., storage systems 400, 402, 404) may include various components (e.g., components 406 for storage system 400; components 408 for storage system 402; and components 410 for storage system 404). These components may generate log files (e.g., log files 412, 414, 416) for processing internally and/or for processing externally (e.g., via a vendor support system). communicate log files (e.g., log files 406, 408, 410) to a vendor support system (e.g., storage system 418). In some implementations, storage systems (e.g., storage systems 400, 402, 404) communicate log files (e.g., log files 420, 422, 424, respectively) to the vendor support system (e.g., storage system 418) for further processing. As will be described in greater detail below, overlogging detection process 10 generates a report (e.g., report 426) with potential overlogging issues.

In some implementations, overlogging detection process 10 may process 300 a plurality of log files as shown in the flowchart of FIGS. 5-8. For example, overlogging detection process 10 may start (e.g., start 500) by processing 300 each log event by determining (e.g., at action 502) a log input type. A log type (e.g., log type 504) may describe whether the log input is a log file (e.g., log file 506) a log stream (e.g., log stream 508), or another type of log input. Log type 504 may be a configuration file processed by overlogging detection process 10 when processing 300 each log input. In some implementations, log type 504 may be user-defined or a default listing of log types for a storage system. As discussed above, a log file (e.g., log file 506) is a discrete data file including: a time stamp or string representing time; a log severity, an associated component, and a log statement describing the issue or describing a reference to an issue (e.g., log codes); and other relevant data. A log stream (e.g., log stream 508) is a sequence of log events or log files that share the same source. As such, log stream 508 may be processed differently than log file 506. Continuing with the example of FIG. 5, suppose overlogging detection process 10 determines that the log input is a log file (e.g., log file 506), overlogging detection process 10 determines (e.g., at action 510) if the log file size exceeds a predefined threshold (e.g., log file size threshold 512). For example, log file size threshold 512 may be user-defined or a default value that determines the log file size at which a large log file should be divided into a plurality of smaller log portions.

Figure 6:
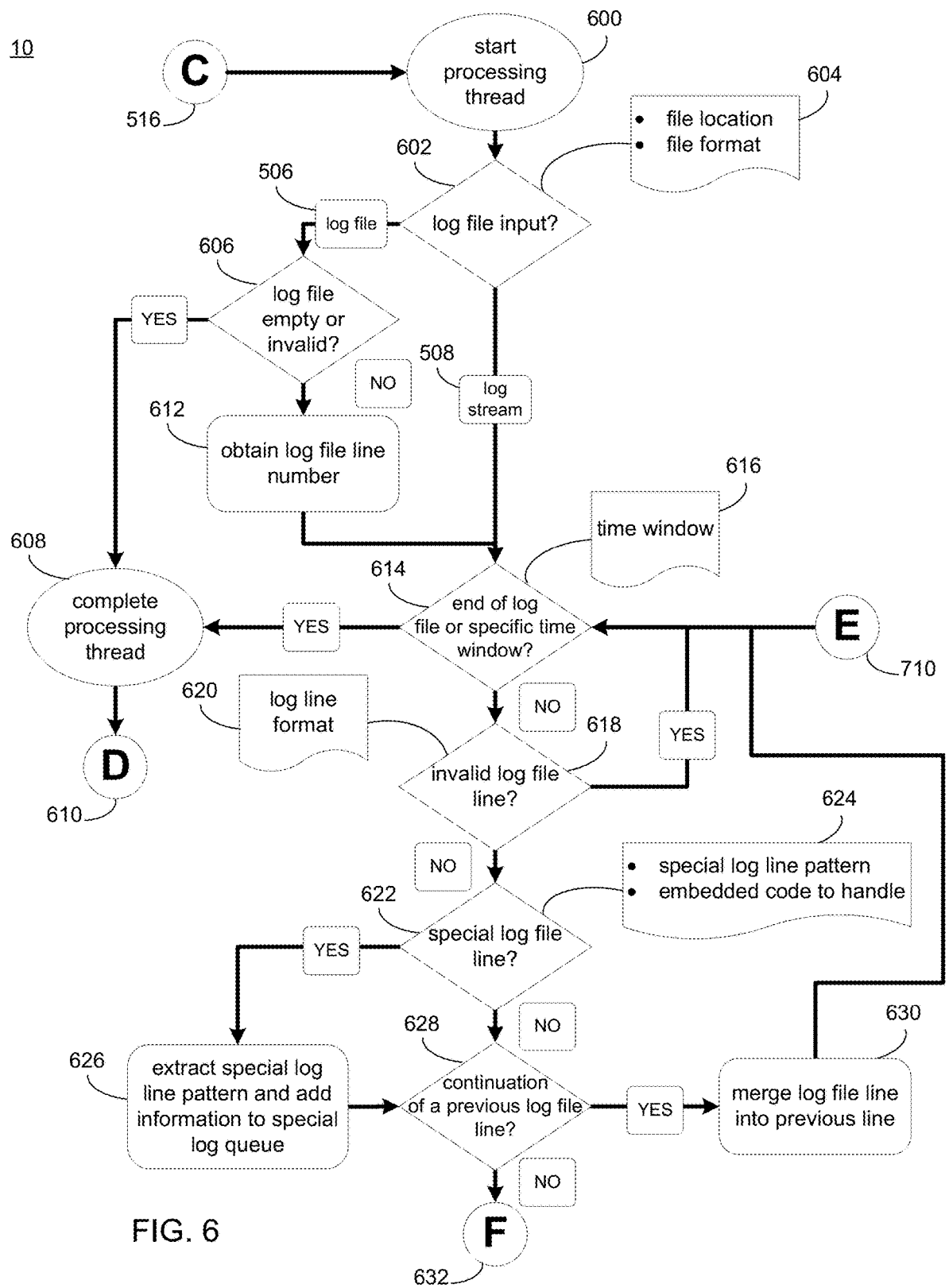

In some implementations, processing 300 the plurality of log files includes dividing 306 the log file into a plurality of log file portions. Continuing with the example of FIG. 5, suppose overlogging detection process 10 determines that log file 506 has a log file size that exceeds log file size threshold 512. In this example, overlogging detection process 10 divides 306 (e.g., at action 514) log file 506 into a plurality of log file portions. The size and number of log file portions may be user-defined and/or a default value. With log file 506 divided 306 into a plurality of log file portions, overlogging detection process 10 continues with action 516 as shown in FIG. 6. In another example, suppose that overlogging detection process 10 determines at action 510 that log file 506 does not exceed log file size threshold 512.

In this example, overlogging detection process 10 continues with action 516 as shown in FIG. 6.

Suppose that at action 502, overlogging detection process 10 determines that the log input is a log stream (e.g., log stream 508). In this example, overlogging detection process 10 determines (e.g., at action 518) whether log stream 508 includes or should include a log tag. A log tag is a marker of a particular type of log stream. For example, different systems or components have their own logging strategies. In one example, each component may have a unique log stream format. As such, overlogging detection process 10 determines at action 518 if log stream 508 includes a log tag by comparing log stream 508 to a log tag filter (e.g., log tag filter 520). Log tag filter 520 includes examples of, or executable code to identify, log tags from log stream 508. Suppose that overlogging detection process 10 determines that log stream 508 does not include a log tag. In this example, overlogging detection process 10 continues with action 516 as shown in FIG. 6. In another example, suppose that overlogging detection process 10 determines that log stream 508 has a log tag (or multiple log tags). In this example, overlogging detection process 10 divides (e.g., at action 522) log stream 508 into log stream groups with a separate log stream group for each log stream. As will be discussed in greater detail below, overlogging detection process 10 may assign specific processing threads to each log stream group to perform bespoke processing on log streams from each log stream group.

In some implementations, overlogging detection process 10 identifies 302 a log pattern concerning the plurality of log files, by processing each log file from the plurality of log files using one or more processing threads. For example, a processing thread is a program or executable code that processes a log file or log stream through various operations to identify 302 a log pattern from the log files or log stream. As will be discussed in greater detail below, a log pattern involving multiple log files or elements of a log stream may be indicative of an overlogging issue. For example, suppose a component repeatedly communicates a log file for a particular issue or component state. In this example, the repeated log files may result in overlogging by wasting processing resources to address the same underlying information and/or by delaying the processing of other log files for different components.

Figure 8:
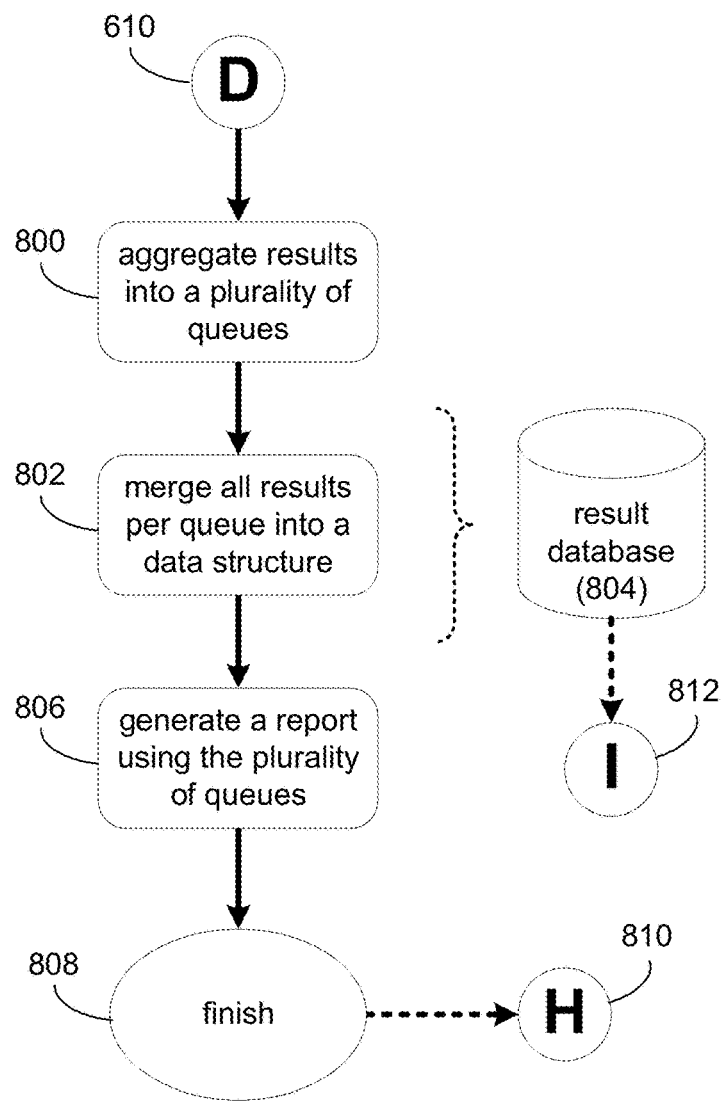

In some implementations, processing each log file from the plurality of log files using one or more processing threads includes processing 308 each log file to identify the log pattern based upon, at least in part, one or more of: a log file location; a log file format; a time window associated with the log file; and a log line format. Referring also to FIG. 6, suppose that overlogging detection process 10 continues from FIG. 5 as shown in action 516. In this example, overlogging detection process 10 defines a pool of processing threads configured to process each log file or log stream. Accordingly, overlogging detection process 10 starts (e.g., at action 600) a processing thread for a particular log file or log stream. Overlogging detection process 10 determines (e.g., at action 602) whether the log file being processed by the processing thread is a log file or a log stream. In some implementations, overlogging detection process 10 includes log input information 604 that describe where and how log files or log streams are processed. In some implementations, log input information 604 is user-defined. In one example, suppose that overlogging detection process 10 determines at action 602 that the processing thread is processing a log file (e.g., log file 506). In this example, overlogging detection process 10 determines (e.g., at action 606) if log file 506 is empty or invalid. If log file 506 is empty or invalid, the processing thread completes its work (e.g., at action 608) and continues with action 610 as shown in FIG. 8. If log file 506 is not empty and not invalid, overlogging detection process 10 determines (e.g., at action 612) a log file line number for processing. In this example, overlogging detection process 10 determines (e.g., at action 614) whether the log file line is at the end of log file 506. If so, overlogging detection process 10 completes its work (e.g., at action 608) and continues with action 610 as shown in FIG. 8. If not and as will be described in greater detail below, overlogging detection process 10 continues to determine whether the log file line is valid.

In another example, suppose that overlogging detection process 10 determines (e.g., at action 602) that the processing thread is processing a log stream (e.g., log stream 508). In this example, overlogging detection process 10 continues to determine (e.g., at action 614) whether the log stream is within a predefined time window. For example, each log event within log stream 508 within the time window is processed. The predefined time window (e.g., time window 616) is defined such that only log events in a top "N" rate and percentage are processed with others not being processed. In one example, the default time window is ten minutes and the top "N" rate and percentage are other predefined values. However, each of these parameters may be configured by a user as any value within the scope of the present disclosure. If the log stream is not within time window 616, overlogging detection process 10 completes its work (e.g., at action 608) and continues with action 610 as shown in FIG. 8. If the log stream is within time window 616 and as will be described in greater detail below, overlogging detection process 10 continues to determine whether the log file line is valid.

Continuing with the above example, suppose overlogging detection process 10 determines (e.g., at action 614) that the log stream is within time window 616 and that the log file/log stream line number is not the last line number, overlogging detection process 10 determines (e.g., at action 618) whether the log file line is invalid. For example, log line format 620 may be configured to define a particular format for the log line. In one example, log line format 620 includes log line patterns to be skipped during processing. Suppose overlogging detection process 10 determines (e.g., at action 618) that log file 506 is invalid based on log line format 620. In this example, overlogging detection process 10 determines (e.g., at action 614) whether there are other log lines to process. If not, overlogging detection process 10 completes its work (e.g., at action 608) and continues with action 610 as shown in FIG. 8. If so, overlogging detection process 10 continues to action 618 with a next log line. Now suppose that overlogging detection process 10 determines (e.g., at action 618) that log file 506 is not invalid based on log line format 620. In this example, overlogging detection process 10 continues by determining (e.g., at action 622) whether the log line includes a special log line. For example, overlogging detection process 10 may include a special log line file (e.g., special log line file 624) with examples of special log line patterns to identify and/or embedded code that, when executed, identifies a special log line. In some implementations, a user may configure special log line file 624 with examples of particular log lines associated with overlogging, embedded code that identifies particular patterns, etc. In this manner, user-defined rules or examples of suspect log lines can be processed using the one or more processing threads.

Continuing with the above example, suppose that overlogging detection process 10 determines that the log line is special based on special log line file 624. In this example, overlogging detection process 10 extracts (e.g., at action 626) the special log pattern and, as will be discussed in greater detail below, stores the pattern information in a queue (e.g., a special log queue). Following the extraction and storing of the special log pattern, overlogging detection process 10 determines (e.g., at action 628) whether the log line is a continuation of a previous log line. If so, overlogging detection process 10 merges (e.g., at action 630) the log file line with a previous log file line and then determines (e.g., at action 614) whether there are any additional log lines to process. If overlogging detection process 10 determines (e.g., at action 630) that the log line is not a continuation of a previous log line, overlogging detection process 10 continues with action 632 as shown in FIG. 7.

Figure 7:
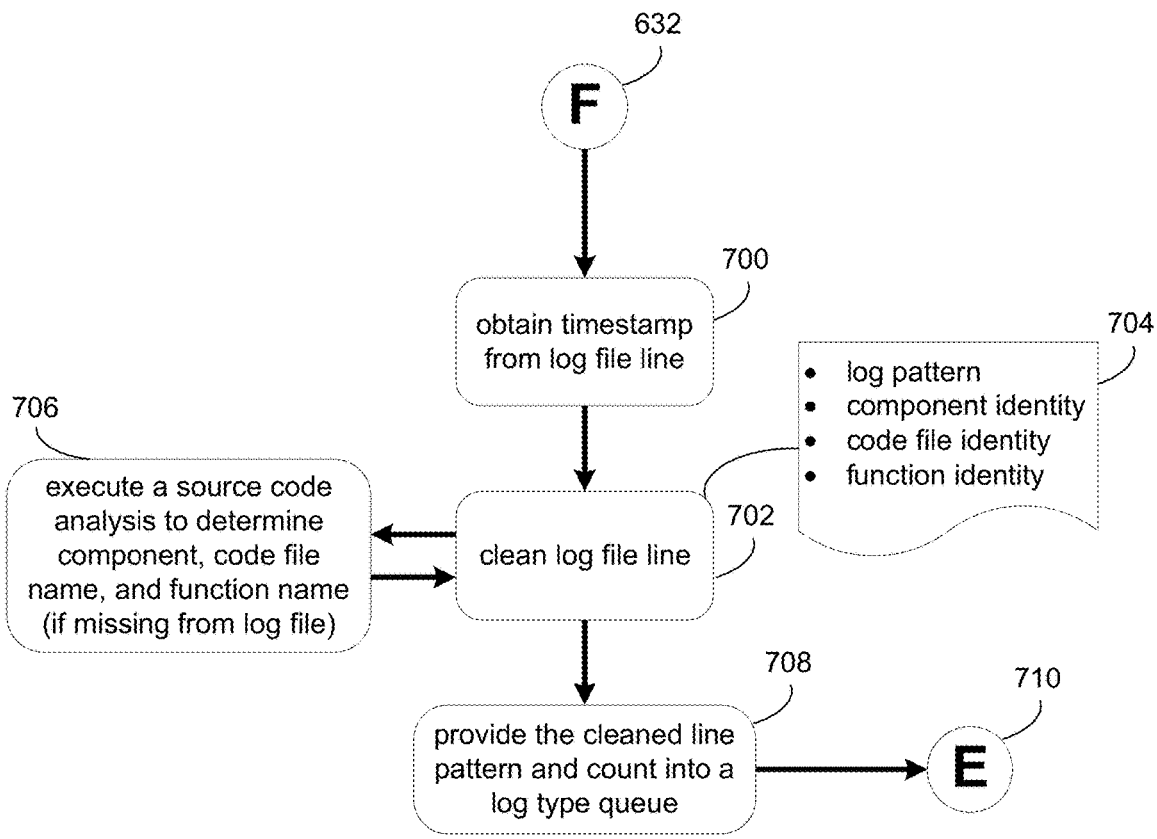

Referring also to FIG. 7 and in some implementations, suppose overlogging detection process 10 is processing a log file line using a processing thread. In this example, overlogging detection process 10 obtains (e.g., at action 700) a timestamp from the log file line. Overlogging detection process 10 "cleans" (e.g., at action 702) the log file line based on log file line cleaning information 704. For example, overlogging detection process 10 uses log file line cleaning information 704 to configure a log file line to normalize the data or format of a log file line. In some implementations, overlogging detection process 10 uses rules or logic in log file cleaning information 704 to identify a log pattern (e.g., a reference or name of a known log pattern); a component identity; a code file identity; and/or a function identity. In some implementations, overlogging detection process 10 may execute (e.g., at action 706) a source code analysis to determine component, code file name, function name, etc. from the log file line. For example, not all storage systems include the information about components, source code names, and/or functions in their log statements. Accordingly, overlogging detection process 10 maintains a source code logging patterns database for further comparison. In some implementations, overlogging detection process 10 provides (e.g., at action 708) the cleaned log line pattern and count into a log type queue and continues to action 710 as shown in FIG. 6. For example, overlogging detection process 10 determines whether the cleaned log line is the last log line and if so, overlogging detection process 10 completes its work (e.g., at action 608) and continues with action 610 as shown in FIG. 8. Otherwise, overlogging detection process 10 continues to action 618 with the next log line.

In some implementations, processing each log file from the plurality of log files using one or more processing threads includes aggregating 310 results from the one or more processing threads for each log file into a plurality of queues. Referring also to FIG. 8, suppose that overlogging detection process 10 completes the processing of a log file with a processing thread as described in FIG. 6 and continues to action 610. In this example, overlogging detection process 10 aggregates 310 results from the processing by the one or more processing threads for each log file into a plurality of queues. For example, overlogging detection process 10 may generate a plurality of queues for different types of information associated with the processing of the plurality of log files.

As discussed above, various features across log files may be indicative of overlogging (i.e., the over production and transmission of log files concerning the same state or issue). Accordingly and as discussed above, overlogging detection process 10 uses the processing threads to process each log file to identify information from the plurality of log files to identify a log pattern concerning at least two log files. For example, overlogging detection process 10 may generate a plurality of queues configured to store the aggregated results of the processing threads. In one example, the plurality of processing threads. Specifically, various queues may be defined for processing log files and log streams for: information (e.g., a log file information queue and a log stream information queue); component information (e.g., a component queue); log type information a number of log events in all of the cleaned log lines of a log file (e.g., log type information queue); and user-defined information (e.g., a special log queue). In this manner, processing threads may process each log file or stream for particular information and provide the results to each queue.

In some implementations, overlogging detection process 10 merges (e.g., at action 802) the results per queue into a data structure (e.g., result database 804). For example, overlogging detection process 10 merges the results in each queue to determine a percentage of log files associated with each component; a percentage of log files associated a particular source code file; the percentage of log files associated with a particular function; a logging rate of log files associated with a particular log pattern; a percentage of log files associated with a particular log pattern; and/or other log pattern metrics.

In some implementations, overlogging detection process 10 identifies 304 a potential overlogging issue associated with the log pattern. For example, with the merged results, overlogging detection process 10 sorts the results to identify the logging rates and percentages of various log patterns (e.g., based upon components, source codes, functions, etc.) that may be indicative of an overlogging issue. In some implementations, overlogging detection process 10 includes one or more thresholds for identifying potential overlogging issues. For example, overlogging detection process 10 may include a database of log patterns and overlogging issues with various results (e.g., a percentage of log files associated with each component; a percentage of log files associated a particular source code file; the percentage of log files associated with a particular function; a logging rate of log files associated with a particular log pattern; a percentage of log files associated with a particular log pattern; and/or other log pattern metrics). In some implementations, overlogging detection process 10 identifies 304 a potential overlogging issue by recognizing a particular log pattern that meets or exceeds a log pattern threshold associated with an overlogging issue.

In some implementations, overlogging detection process 10 generates 312 a report including the potential overlogging issue associated with the log pattern based upon, at least in part, the plurality of queues. As discussed above, overlogging detection process 10 may identify 304 a potential overlogging issue from a log pattern identified in a plurality of log files. In this example, overlogging detection process 10 generates 312 (e.g., at action 806) a report (e.g., report 426) including the top "N" log patterns indicative of an overlogging issue, where "N" is a predefined value. With the report generated 312, overlogging detection process 10 continues to action 808. As will be discussed in greater detail below, overlogging detection process 10 may continue to action 810 for continuous overlogging detection or real-time overlogging detection.

Continuous Overlogging Detection for a Storage System

Figure 9:
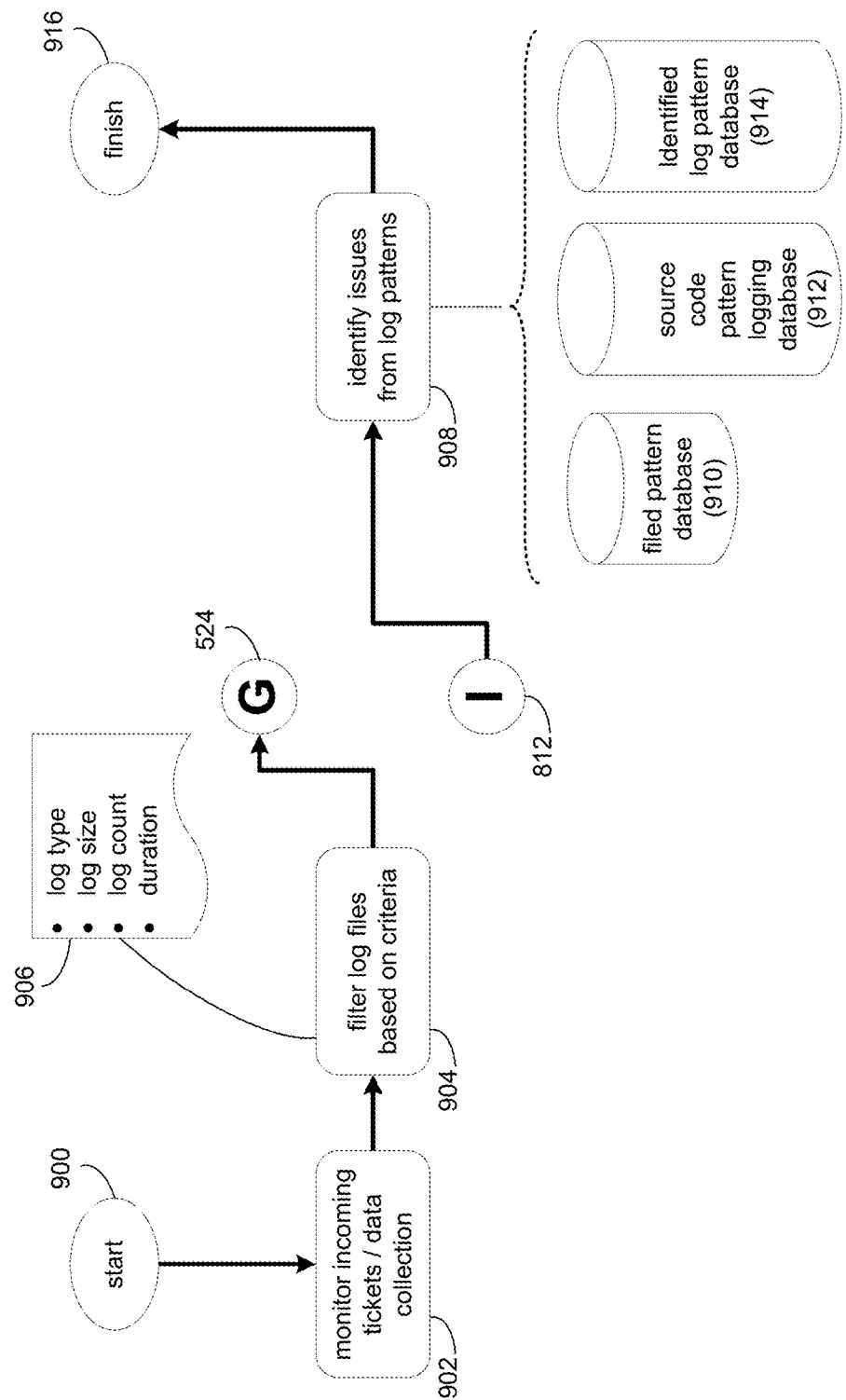
FIG. 9 is an example flowchart of the overlogging detection process for continuous overlogging detection for a storage system according to an example implementation of the disclosure.

Referring also the FIG. 9, overlogging detection process 10 may provide a continuous overlogging detecting system by defining a detection cycle where large amounts of tickets are generated, and the log files are filtered to obtain those log files with potential overlogging issues. As will be discussed in greater detail below, the continuous overlogging detecting system can identify log patterns that are highly likely to be overlogging issues. In some implementations, overlogging detection process 10 monitors 314 the plurality of log files generated by the one or more storage systems for one or more log patterns. For example, overlogging detection process 10 monitors (e.g., at action 902) the plurality of log files for particular log file characteristics.

In some implementations, overlogging detection process 10 filters 316 one or more log files from the plurality of log files based upon, at least in part, the one or more log patterns detected in the plurality of log files. For example, overlogging detection process 10 filters 316 the log files that are likely to have overlogging issues. In some implementations, overlogging detection process 10 uses the log file characteristics (e.g., log file characteristics 906) which include log count, log size, log duration, and/or other user-defined criteria to identify log patterns likely to be associated with an overlogging issue. The filtered log files may be provided (e.g., at action 524) as an input to the processing of log files as shown in FIGS. 5-8 and as discussed above. Overlogging detection process 10 may return (e.g., at action 812) results from one detection cycle as described previously.

In some implementations, overlogging detection process 10 may aggregate the reports of all the analyzed data collection events and identify (e.g., at action 908) which component produces larger percentages of log files, and which log pattern may cause log overflow. For example, overlogging detection process 10 aggregates all the results by a logging rate of log files associated with a particular log pattern; a percentage of log files associated with a particular log pattern; and/or other log pattern metrics, and sorts them, and selects the top "N" log patterns (where "N" may be user-defined). For each log pattern, overlogging detection process 10 can file tickets, triage them based on the component information, and deduplicate the log files (e.g., according to a filed log pattern database (e.g., filed log pattern database 910), a source code logging pattern database (e.g., source code logging pattern database 912), and/or a identified log pattern database (e.g., identified log pattern database 914)). Source code logging pattern database 912 stores log patterns belonging to the same function that appears in the code path for a function. Identified log pattern database 914 may include identified log patterns that have been previously identified by a product engineer when debugging/triaging. For each identified log pattern, the database includes information such as how many times a log pattern has been identified, when the log pattern was identified, the storage systems associated with the identified log patterns, etc. With this information, overlogging detection process 10 improves the detection accuracy. With these results, overlogging detection process 10 may merge log patterns that emerge in the top "N" (i.e., configurable, default is top 10) logging rate and percentage from the same function into one ticket. Overlogging detection process 10 may implement the flow of FIG. 9 as a whole process running cycle, and could also be configured by week, iteration, or release. In some implementations, overlogging detection process 10 may finish (e.g., at action 916). For example, overlogging detection process 10 may verify the log files automatically in a next detection cycle. After this process, the remaining log pattern has a very high possibility of being an overlogging issue.

Real-Time Overlogging Detection in a Storage System

Figure 10:
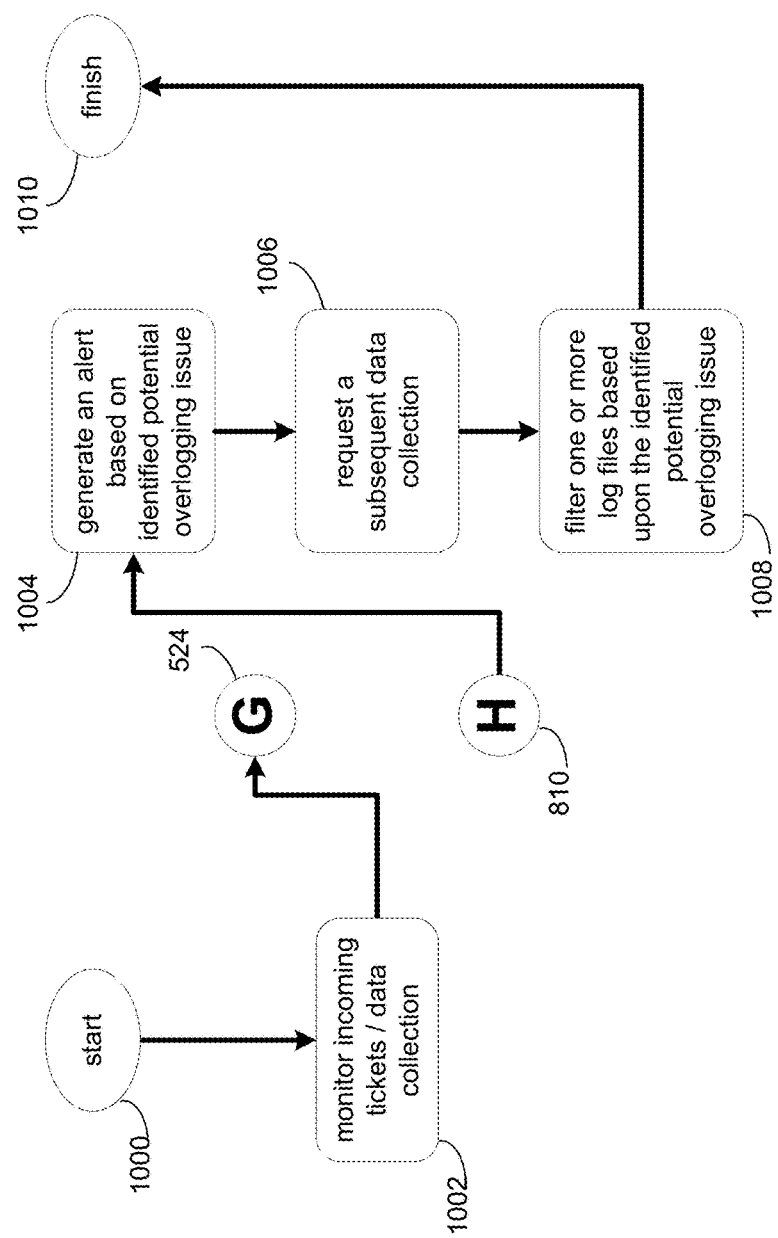
FIG. 10 is an example flowchart of the overlogging detection process for continuous overlogging detection for a storage system according to an example implementation of the disclosure.

Referring also to FIG. 10 and in some implementations, overlogging detection process 10 may allow for real-time overlogging detection in a storage system. For example, overlogging detection process 10 monitors 318 the plurality of log files being generated by the one or more storage systems for one or more log patterns. Overlogging detection process 10 may be adapted for both offline and online overlogging detection. When the above-described process is enabled in a live system, overlogging detection process 10 monitors 318 the plurality of log files by storing analyzed log files in a local lightweight memory database. By the end of a single time slot (e.g., default value is ten minutes), overlogging detection process 10 proceeds with action 524 and returns in action 810 with one or more candidate overlogging issues. Overlogging detection process 10 continues by generating 320 (e.g., at action 1004) an alert indicative of an overlogging issue in response to monitoring a log pattern associated with an overlogging issue. Overlogging detection process 10 requests 322 (e.g., at action 1006) subsequent data collection from the one or more storage systems for additional log files associated with the one or more log patterns. For example, overlogging detection process 10 triggers a data collection engine to collect additional log files (e.g., a predefined threshold of files or time window) in case the log files around the relevant time are necessary for further investigation.

In some implementations, overlogging detection process 10 filters 324 (e.g., at action 1008) one or more log files from the plurality of log files based upon, at least in part, the one or more log patterns detected in the plurality of log files. For example, overlogging detection process 10 flushes the top "N" (e.g., default value is ten) log patterns to a storage device and merges the log patterns with the subsequent data collection log files. In some implementations, overlogging detection process 10 may transit the log files to a vendor storage system for improving the continuous overlogging detection of the present disclosure. Overlogging detection process 10 completes the real-time logging detection with action 1010.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
processing a plurality of log files from one or more storage systems;
identifying a log pattern concerning at least two or more log files, by processing each log file from the plurality of log files using one or more processing threads;
identifying a potential overlogging issue associated with the log pattern;
monitoring the plurality of log files being generated by the one or more storage systems for one or more log patterns; and
generating an alert indicative of an overlogging issue in response to detecting a log pattern associated with an overlogging issue.

2. The computer-implemented method of claim 1, further comprising:
  monitoring the plurality of log files generated by the one or more storage systems for one or more log patterns; and
  filtering one or more log files from the plurality of log files based upon, at least in part, the one or more log patterns detected in the plurality of log files.

3. The computer-implemented method of claim 1, further comprising:
  requesting subsequent data collection from the one or more storage systems for additional log files associated with the one or more log patterns; and
  filtering one or more log files from the plurality of log files based upon, at least in part, the one or more log patterns detected in the plurality of log files.

4. The computer-implemented method of claim 1, wherein processing the plurality of log files includes dividing the log file into a plurality of log file portions.

5. The computer-implemented method of claim 1, wherein processing each log file from the plurality of log files using the one or more processing threads includes processing each log file to identify the log pattern based upon, at least in part, one or more of:
  a log file location;
  a log file format;
  a time window associated with the log file; and
  a log line format.

6. The computer-implemented method of claim 5, wherein processing each log file from the plurality of log files using the one or more processing threads includes aggregating results from the one or more processing threads for each log file into a plurality of queues.

7. The computer-implemented method of claim 6, further comprising:
  generating a report including the potential overlogging issue associated with the log pattern based upon, at least in part, the plurality of queues.

8. A computer program product residing on a non-transitory computer readable medium having a plurality of instructions stored thereon which, when executed by a processor, cause the processor to perform operations comprising:
  processing a plurality of log files from one or more storage systems;
  identifying a log pattern concerning at least two or more log files, by processing each log file from the plurality of log files using one or more processing threads;
  identifying a potential overlogging issue associated with the log pattern;
  monitoring the plurality of log files being generated by the one or more storage systems for one or more log patterns;
  generating an alert indicative of an overlogging issue in response to detecting a log pattern associated with an overlogging issue;
  requesting subsequent data collection from the one or more storage systems for additional log files associated with the one or more log patterns; and
  filtering one or more log files from the plurality of log files based upon, at least in part, the one or more log patterns detected in the plurality of log files.

9. The computer program product of claim 8, wherein the operations further comprise:
  monitoring the plurality of log files generated by the one or more storage systems for one or more log patterns; and
  filtering one or more log files from the plurality of log files based upon, at least in part, the one or more log patterns detected in the plurality of log files.

10. The computer program product of claim 8, wherein processing the plurality of log files includes dividing the log file into a plurality of log file portions.

11. The computer program product of claim 8, wherein processing each log file from the plurality of log files using the one or more processing threads includes processing each log file to identify the log pattern based upon, at least in part, one or more of:
  a log file location;
  a log file format;
  a time window associated with the log file; and
  a log line format.

12. The computer program product of claim 11, wherein processing each log file from the plurality of log files using the one or more processing threads includes aggregating results from the one or more processing threads for each log file into a plurality of queues.

13. The computer program product of claim 12, wherein the operations further comprise:
  generating a report including the potential overlogging issue associated with the log pattern based upon, at least in part, the plurality of queues.

14. A computing system comprising:
  a memory; and
  a processor configured to:
    process a plurality of log files from one or more storage systems,
    identify a log pattern concerning at least two or more log files, by processing each log file from the plurality of log files using one or more processing threads,
    identify a potential overlogging issue associated with the log pattern,
    monitor the plurality of log files being generated by the one or more storage systems for one or more log patterns,
    generate an alert indicative of an overlogging issue in response to detecting a log pattern associated with an overlogging issue;
    request subsequent data collection from the one or more storage systems for additional log files associated with the one or more log patterns; and
    filter one or more log files from the plurality of log files based upon, at least in part, the one or more log patterns detected in the plurality of log files.

15. The computing system of claim 14, wherein the processor is further configured to:
  monitor the plurality of log files generated by the one or more storage systems for one or more log patterns; and
  filter one or more log files from the plurality of log files based upon, at least in part, the one or more log patterns detected in the plurality of log files.

16. The computing system of claim 14, wherein processing the plurality of log files includes dividing the log file into a plurality of log file portions.

17. The computing system of claim 14, wherein processing each log file from the plurality of log files using the one or more processing threads includes processing each log file to identify the log pattern based upon, at least in part, one or more of:
  a log file location;
  a log file format;
  a time window associated with the log file; and
  a log line format.

18. The computing system of claim 17, wherein processing each log file from the plurality of log files using the one or more processing threads includes aggregating results from the one or more processing threads for each log file into a plurality of queues.

\* \* \* \* \*